Oct. 2, 1934.  W. C. CORYELL  1,975,536
METHOD OF PROMOTING POLLINATION
Filed April 24, 1933
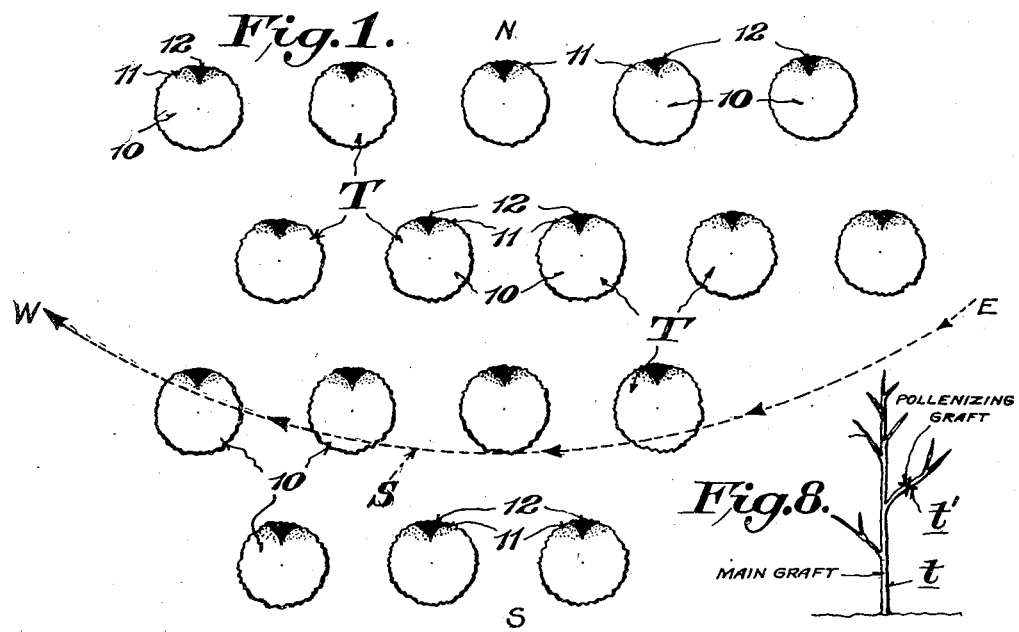
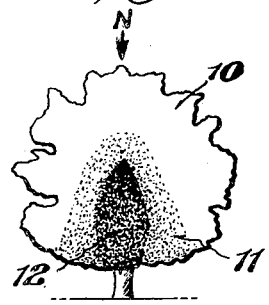
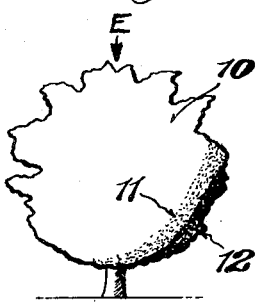
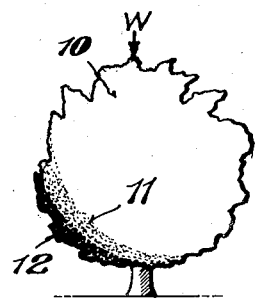
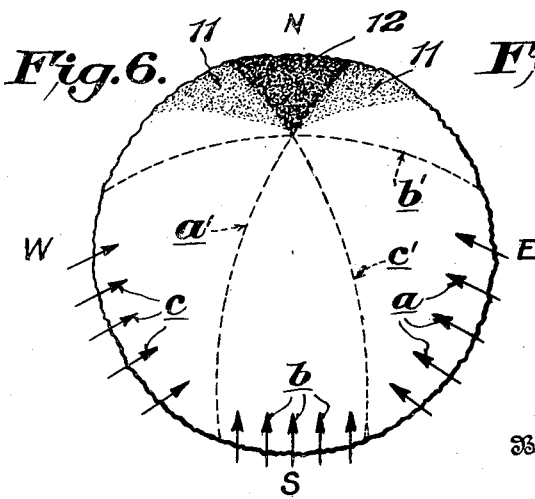
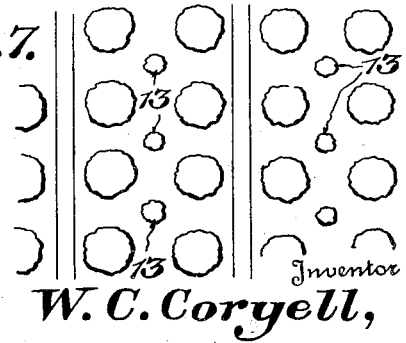
Inventor
W. C. Coryell,
By
Attorney Patented Oct. 2, 1934

1,975,536

UNITED STATES PATENT OFFICE 1,975,536

METHOD OF PROMOTING POLLINATION

William C. Coryell, Youngstown, Ohio

Application April 24, 1933, Serial No. 667,743

7 Claims. (Cl. 47—6)

This invention relates to the art of propagating trees, and, generally speaking, has special reference to novel provisions for obtaining exceptionally effective blossom pollination.

More particularly, the invention relates to the propagation of fruit trees; that is, to any form of grafting whereby the living bud or embryo of a tree of one variety is transferred to the living stem of a tree of another variety, and in this connection has generally in view to provide a novel method of scion or bud distribution, and ultimately a novel tree structure, whereby more effective pollination with consequent materially higher yield of first quality fruit is obtained than has heretofore been obtained by prior pollinizing methods. In this connection the practice heretofore has been to pollinize choice fruit trees from adjacent trees of less fruit productive value. As distinguished from this, pollination is accomplished according to the present invention preferably by providing pollinizing branches directly on the choice fruit producing trees in the shaded areas thereof, thus to advantageously utilize these poor fruit producing areas.

With the foregoing general purpose in view, the invention consists in the novel method of scion or bud distribution, and in the novel tree structure resulting from the practice of said method, as will be hereinafter more fully described, illustrated in the accompanying drawing and defined in the appended claims.

In the drawing:—

Figure 1 is a diagrammatic plan view of a portion of an orchard illustrating in a general way the shading and the exposure to sunlight of different portions of the trees.

Figures 2, 3, 4 and 5 are diagrammatic side elevations of a tree as viewed from the north, east, south and west, respectively, and illustrating the relationship of shaded area to sun exposed area with reference to the respective major points of the compass.

Figure 6 is an enlarged diagrammatic plan view of a tree illustrating diagrammatically the relationship of the shaded area to the sun exposed area thereof.

Figure 7 is a view similar to Fig. 1 illustrating the use of dwarf pollinizing trees in an orchard; and Figure 8 is a view illustrating a small tree after a lateral branch has been grafted or budded thereon in accordance with the invention.

For astronomical reasons which here require no explanation, it is, of course, well known that in the case of an object such as a tree which is located in the Northern Hemisphere and which is not shaded by another object, the eastern, southern, western and top portions thereof are primarily exposed to sunlight during the day, and that a certain relatively small northern and lower portion thereof is subjected only indirectly to sunlight and remains at all times shaded, while to either side of this shaded portion is what may be termed a twilight area which is neither greatly shaded nor exposed to maximum sunlight.

It is also well known that sunlight has such an effect on the leaves and the fruit, that the best leaves and the choicest fruits are developed in and near those parts of the tree that receive a large amount of the sun's rays, while those parts that are densely shaded do not produce the best leaf and fruit development. The word fruit is used in its broad sense. In the case of apples, peaches and other fruits, assuming good pollination, good soil, moisture, etc., the best colored fruits are produced in the best sunlight and the largest fruits are produced where the leaves are well developed, and where they get the strong sunlight. It is also well known that fruit generally develops best where the cross-pollination is best, and that pollination is best where the distance between cross-pollinizing flowers is shortest, or where bees can operate most easily. It is a matter of quite common observation that the choicest quality fruits (color, size, etc.) are in the top and sun exposed areas of the tree, and the second quality fruits are in the northern and interior and under parts of the tree. If there is a third choice quality of fruit on the tree, it is found in a small area on the lower branches on the north side of the tree, and interior to that area.

Now, in view of the foregoing, the present invention resides, in grafting onto the main tree, preferably a young tree in the nursery, scions or buds of the desired first choice variety, and when the tree is of proper size to bear lateral branches, in then grafting or budding onto a lateral branch another variety which is adapted to serve as a pollinizer for the main tree. This is illustrated in Fig. 8 of the drawing wherein the small tree is designated as $t$ and branch grafted thereon is designated as $t'$. Then when the tree is set out or planted in the orchard, it is my purpose to select a northerly position for the pollinizing branch or variety. The tree will then be self-pollinizing, yet the tree will be practically a full bearing tree, and every tree in the orchard may be a first choice fruit bearing tree, as distinguished from the present wasteful practice of devoting certain of the tree spaces in orchards to the growth of second choice or non-bearing, pollinizing trees. A minimum of orchard space will thus be lost and what space is lost is comprised by those relatively minor, deeply and more or less constantly shaded northern portions of the trees which are of least and of little or no fruit producing value. Also, in this way the pollinizing flowers are disposed closely adjacent to the fruit producing blooms so as to effect a high degree of pollination and thus cause an abundant and approximately maximum production or yield of the highest quality fruit of the chosen variety. Thus, too, any necessity for the expensive practice of "flowering" is avoided. Of course, instead of grafting young trees in the nursery, the method obviously may be practiced on growing trees in the orchard.

It is well known in apple growing, for example, that poorly pollinized flowers do not develop into large fruits, and if the pistils on one side of the flower are well pollinized and the pistils on the opposite side are not pollinized or are poorly pollinized, the resulting apple is lop-sided, the better development of the fruit being on the side where the pollinizing is the better. Again it is well established that bee pollinizing is vastly superior to wind pollinizing. It is considered worth while practice at this time in apple culture, to locate a five pound hive of bees to the acre of apple orchard, this being on the assumption of the pollinizing trees being in some arrangement of alternating rows or groups of trees. According to the present invention, the pollinizing flowers are much more contiguous than has been the practice heretofore, so a bee is enabled to cross fertilize a vastly larger number of flowers in a day's work than it could do when the flowers are so widely spread apart as is the present old practice. A further advantage lies in the fact that the pollen of the pollinizing variety is much more effectively used by the bees, in that it is closer to the point where the pollen is deposited. The bee therefore needs less of the pollinizing variety of pollen than it otherwise would.

Since an undersized fruit, or a lop-sided fruit is not an A-1 grade, it is readily seen that the tree of this invention will produce with the assistance of even a smaller number of bees, a larger proportion of A-1 fruit, when compared with pollinizing trees spaced apart. Then too, all trees may now be of the first choice variety. Therefore not only is more A-1 quality of fruit obtained per tree, but more first choice trees per acre is possible. It therefore follows that there is obtained in one stroke an appreciable increase in percentage of A-1 quality fruit, and also a material increase of quantity of first choice variety. It is of course well known that A-1 quality in fruits command better prices, so the orchardist doubly profits in getting both higher quality, and more quantity of his chosen variety, for he has more first choice trees per acre.

Figure 1 of the drawing illustrates diagrammatically a section of an orchard in which the trees, designated as T, are planted at suitable evenly spaced intervals in parallel rows according to the well known triangular system of planting in which the trees of adjacent rows are disalined and the trees of alternate rows are alined in a direction at right angles to the rows. This is a practical and preferred method of planting, but, obviously, is by no means essential. In Fig. 1 the general course of the sun from east to west and in a southern direction is indicated by the dash line S, while those portions of the trees which are exposed to primary or maximum sunlight are designated as 10 and the portions which are subjected to some, but less sunlight are designated as 11.

Referring particularly to Fig. 6 of the drawing, the arrows $a$ and the curved line $a'$ indicate that during the morning hours the top and eastern portions of the tree, somewhat towards the south and away from the north are subjected to primary or maximum sunlight; the arrows $b$ and the curved line $b'$ indicate that during the middle hours of the day the top and the southern portions, as well as eastern and western side portions of the tree are subjected to primary or maximum sunlight, and the arrows $c$ and the curved line $c'$ indicate that during the afternoon hours the top and western portions of the tree, somewhat towards the south and away from the north, are subjected to primary or maximum sunlight. Figs. 3 and 5 illustrate in side elevation the relatively minor northerly areas of the tree which are shaded, while Figs. 3 to 5 illustrate the relatively major areas of the trees which are exposed to primary or maximum sunlight as viewed from the east, the south and the west, respectively. The obvious result is that at the north side of the tree there is a more or less constantly shaded portion of narrow maximum width, designated as 12 in Figs. 2 and 6, which extends from the bottom of the foliage upwardly approximately, varying with the latitude and the design of the tree, between one-third and one-half of the height of the foliage, and which decreases in width towards its upper end. This constantly shaded portion in the average tree may be regarded as non-productive of first quality fruit and may occupy an area approximating possibly between one and two percent of the total external tree area. Now, in accordance with the invention, the pollinizing scions or buds are confined, or substantially confined, to the branches occupying this more or less constantly shaded area, and scions or buds of a first choice variety of fruit are devoted to the outer branches occupying all, or substantially all, of the major portion 10 of the total tree area which is subjected to primary or maximum sunlight, as well as to the outer branches occupying those northeastern and northwestern portions 11 of relatively minor, so-called twilight area which border the constantly shaded area 12 and which are subjected neither to maximum sunlight nor to constant shade. Therefore, scions or buds of a first choice variety of fruit are, as far as practicable, borne on those branches which are capable of producing first choice fruit and which underlie the outer branches of the areas which are exposed to primary or maximum sunlight, and scions or buds of a second choice variety of fruit are, as far as practicable, borne on the remaining branches within the portions which are exposed to little sunlight. In addition, scions or buds of a third choice variety of fruit may be grafted or budded onto the innermost branches of the last mentioned area of the tree and also onto the branches underlying the outer branches of the twilight areas 11, and in this a double pollinizing effect may be obtained. Thus, as previously indicated, the present method and tree provides for obtaining a higher standard of production as measured by quality, and a higher standard of first choice fruit as measured by quantity, at less cost and labor, than has been obtained by prior pollinizing and grafting or budding methods.

As the invention is not concerned with any particular grafting or budding method per se, but, on the contrary, is concerned primarily with the relative disposition of pollinizing scions or buds, it will, of course, be understood that any grafting method per se may be employed. Also, it is to be understood that the scions or buds may be of any appropriate genus, species or variety.

In practicing the present invention the orchardist may, of course, suitably mark the grafts or buds with markers, or he may locate the grafts or buds in distinguishing positions so that they will readily be recognized for guidance in trimming the trees; usually the latter is sufficient identification. Moreover, the orchardist will by practice be able to closely estimate the growth of the tree so as to properly distribute the respective pollinizing and fruit scions or buds when he is trimming the tree or thinning the fruit.

In Figure 7 of the drawing is diagrammatically illustrated a section of an orchard in which the trees are planted according to the "square" system; that is, in evenly spaced rows extending in right angular directions. In such an orchard and others of a generally similar type there are waste spaces at the centers of each square or substantially square areas between the trees, and the invention contemplates as an alternative to the method of Fig. 1, the utilizing of these non-productive spots for the growing of pollinizing flowers, preferably with dwarf trees, indicated as 13, which may be produced by grafting the scions or buds of a desired pollinizing variety onto the roots of some small, hardly tree such, for example, as a quince or crabapple tree. Or, if dwarf trees are not used, normal trees of a pollinizing variety may be used by the practice of severely trimming the trees 13 back to a small size. In other words, regardless of the arrangement of the trees in an orchard, the trees may individually be treated as illustrated and described in connection with Figs. 1 to 6 of the drawing, or, alternatively, small sized pollinizing trees may be employed at otherwise wasted and non-productive spots as illustrated, for example, in Fig. 7.

Without further description it is thought that the features and advantages of the invention will be readily apparent to those skilled in the art, and it will of course be understood that changes in the form, proportion and minor details of construction may be resorted to, without departing from the spirit of the invention and scope of the appended claims.

I claim:—

1. The method of promoting the pollination and the productivity of a fruit tree which consists in propagating pollinizing scions or buds on the branches of the substantially constantly shaded area at the lower part of the north side of the tree.

2. The method of promoting the productivity of a fruit tree which consists in propagating first choice fruit scions or buds on those portions of the tree which are subjected to primary and maximum sunlight, and in propagating second choice scions or buds on those portions of the tree which are neither constantly shaded nor exposed to primary or maximum sunlight.

3. The method of promoting the pollination and the productivity of a fruit tree which consists in propagating pollinizing scions or buds on the branches of the substantially constantly shaded area at the lower part of the north side of the tree, and in propagating first choice fruit scions or buds on substantially all of the branches of the tree which are exposed to primary and maximum sunlight.

4. The method as set forth in claim 3 including the step of propagating second choice fruit scions or buds on those branches of the tree which are neither constantly shaded nor exposed to primary or maximum sunlight.

5. The method of promoting the pollination and the productivity of a fruit tree which consists in propagating pollinizing scions or buds on the branches of the substantially constantly shaded area at the lower part of the north side of the tree, propagating first choice fruit scions or buds on the outer branches and such of the underlying branches of the tree as are subjected to substantially primary or maximum sunlight, and in propagating second choice fruit scions or buds on other portions of the tree which are subjected neither to constant shade nor to primary or maximum sunlight.

6. The method of promoting the pollination and the productivity of fruit trees which consists in propagating fruit bearing flowers on such parts of the trees as are known to produce first quality fruit, and propagating pollinizing flowers on such other parts of the trees as are known not to be productive of first quality fruit.

7. The method of promoting the pollination and the productivity of fruit trees in an orchard which consists in propagating fruit bearing flowers on such parts of the trees as are known to produce first quality fruit, and propagating another variety of flowers for pollinizing purposes in such well distributed places in the orchard contiguous to the fruit bearing flowers as are not available for producing first quality fruit.

WILLIAM C. CORYELL.